UNITED STATES PATENT OFFICE 2,391,993

2-THIOCYANOTHIAZOLINES

Roger A. Mathes, Akron, Ohio, assignor to The B. F. Goodrich Company, New York, N. Y., a corporation of New York No Drawing. Application December 2, 1944,
Serial No. 566,398

2 Claims. (Cl. 260—302)

This invention relates to new compounds consisting of thiocyanothiazolines, and to the method of preparing the same.

The object of this invention is to prepare thiocyanothiazolines which are active accelerators of the vulcanization of rubber, although they may also be used in the field of biochemistry as insecticides, fungicides, etc. Among the rubbers with which my new accelerator may be used are all varieties of natural rubber, latex, reclaimed rubber, artificial rubber isomers, and all synthetic rubbers capable of being vulcanized with sulfur. These new accelerators may be added to the rubber on a roll mill or in an internal mixer or by any other suitable method. To obtain the maximum activity of these accelerators, it is advantageous to use them in the presence of carboxylic acids. Other compounding ingredients, such as any of the ordinary pigments, fillers, dyes, antioxidants, or other accelerators of vulcanization may be employed together with my new materials.

According to my invention, thiocyanothiazolines can be prepared by reacting an alkali metal salt of a mercaptothiazoline with a cyanogen halide in the presence of any of the commonly used reaction diluents, such as water, benzene, alcohol, ether, etc. As the reaction is exothermic, a means of cooling the reaction mixture should be provided to prevent undesirable reactions which might occur at high temperatures, particularly the oxidation of the mercaptothiazoline to its disulfide.

The reaction may be represented as taking place in the following manner:

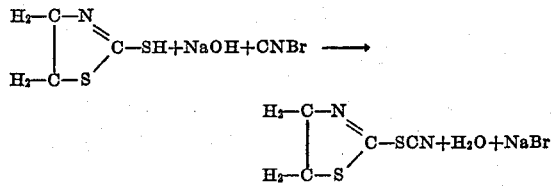

where $R_1$, $R_2$, $R_3$ and $R_4$ may be hydrogen, alkyl group, alkoxy groups, or aryl groups; M is an alkali metal, and X is a halogen.

The following is a specific example of the invention and not a limitation thereof.

A solution of the sodium salt of 2-mercaptothiazoline is first prepared by adding 23.8 grams of the mercaptothiazoline to a solution of 8.4 grams of sodium hydroxide pellets in 100 ml. of ethanol. A very small amount of undissolved material is filtered off, and this solution is placed in a 500 cc. flask equipped with a stirring device, thermometer and a dropping funnel. A solution of 21.2 grams of cyanogen bromide in 100 ml. of ethanol is then added dropwise during a period of 30 minutes, with constant stirring and cooling which keeps the temperature of the reaction mixture at 20° C. or below. The white precipitate that forms is the reaction by-product, sodium bromide. After removing the precipitate by filtration, the reaction produce is extracted with hexane and subsequently with water and dried. The final product consists of 26.8 grams of a viscous orange-colored oil which represents a yield of 93%. This reaction may be represented as taking place in the following manner:

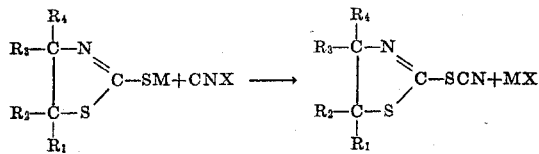

The thiocyanothiazoline formed in the above reaction is 2-thiocyanothiazoline which is very stable. Samples of the viscous oil have remained unchanged over a period of two to three years.

Thiazolines that can be substituted in the above example in place of the unsubstituted 2-mercaptothiazoline to form correspondingly substituted thiocyanothiazolines are:

2-mercapto-4-methyl-thiazoline
2-mercapto-4:4-dimethyl-thiazoline
2-mercapto-4:5-dimethyl-thiazoline
2-mercapto-5:5-dimethyl-thiazoline
2-mercapto-5-ethyl-thiazoline
2-mercapto-4-ethyl-thiazoline
2-mercapto-4-butyl-thiazoline
2-mercapto-4-methyl-5-butyl-thiazoline
2-mercapto-4-benzyl-thiazoline
2-mercapto-4-phenyl-thiazoline
2-mercapto-4-beta-hydroxyethyl-thiazoline
2-mercapto-4-beta-chlorethyl-thiazoline
2-mercapto-4-OH-thiazoline
2-mercapto-4-chloro-thiazoline
2-mercapto-4-amino-thiazoline
2-mercapto-5-chloro-thiazoline
2-mercapto-5-OH-thiazoline
2-mercapto-5-amino-thiazoline But since the unsubstituted 2-mercaptothiazoline is more readily obtainable and lower in cost than other 2-mercaptothiazolines, its use for the preparation of the thiocyanothiazoline accelerator is preferred.

Cyanogen chloride may be used in place of cyanogen bromide in my invention with equal results, but the method of addition of cyanogen chloride to the reaction mixture should be varied, for cyanogen chloride is a vapor at room temperature and should be added beneath the surface of the reaction mixture.

As an indication of the accelerating power of these compounds, I shall describe the effect produced in rubber by the product of the above example. The following rubber composition, in which the parts are by weight, was prepared:

| | |
|---|---|
| Rubber | 100 |
| Zinc oxide | 5 |
| Sulfur | 3 |
| Lauric acid | 3 |
| 2-thiocyanothiazoline | 1 |

After vulcanization in a press at 287° F., the composition had the physical properties shown in the following table, in which T is the ultimate tensile strength in lb./sq. in. and E is the ultimate elongation in percent.

| Time of vulcanization, in minutes | T | E |
|---|---|---|
| 15 | 3,190 | 815 |
| 30 | 3,690 | 770 |
| 60 | 3,550 | 730 |
| 90 | 2,990 | 700 |

The above data indicate that an optimum cure of less than 30 minutes can be obtained while the vulcanization of the same stock without a vulcanization accelerator would take 2 to 3 hours at the same temperature, but equally as good results may be obtained using other thiocyanothiazolines.

While I have herein disclosed certain preferred manners of performing my invention, I do not thereby desire or intend to limit myself solely thereto, for as heretofore stated materials having equivalent chemical properties may be employed if desired without departing from the spirit and scope of the invention as defined in the appended claims.

I claim:

1. The thiocyanothiazolines of the general formula:

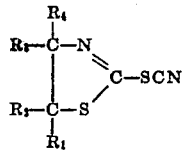

where $R_1$, $R_2$, $R_3$ and $R_4$ are members selected from the group consisting of hydrogen, alkyl hydrocarbons, aryl hydrocarbons, substituted aryls and substituted alkyls.

2. 2-thiocyanothiazoline of the formula:

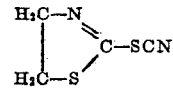

being a viscous orange-colored oil and stable at ordinary temperatures.

ROGER A. MATHES.